United States Patent
Scudder et al.

(10) Patent No.: US 9,178,797 B2
(45) Date of Patent: Nov. 3, 2015

(54) SELECTIVE BGP GRACEFUL RESTART IN REDUNDANT ROUTER DEPLOYMENTS

(75) Inventors: John Galen Scudder, Ann Arbor, MI (US); Ross W. Callon, Westford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 363 days.

(21) Appl. No.: 13/539,424

(22) Filed: Jun. 30, 2012

(65) Prior Publication Data

US 2014/0003227 A1 Jan. 2, 2014

(51) Int. Cl.
  *H04L 12/26* (2006.01)
  *H04L 12/755* (2013.01)
  *H04L 12/757* (2013.01)
  *H04L 29/14* (2006.01)
  *H04L 12/24* (2006.01)
  *H04L 12/715* (2013.01)

(52) U.S. Cl.
  CPC .......... *H04L 45/021* (2013.01); *H04L 41/0668* (2013.01); *H04L 41/0672* (2013.01); *H04L 45/023* (2013.01); *H04L 45/04* (2013.01); *H04L 69/40* (2013.01)

(58) Field of Classification Search
  CPC ... H04L 45/28; H04L 2012/5627; H04L 1/22; H04L 41/0668; H04L 69/40; H04L 41/0654; H04L 41/0659; H04L 41/0663; H04L 41/0672; H04L 41/0677
  USPC .......................... 370/216, 217, 218, 219, 220
  See application file for complete search history.

(56) References Cited

U.S. PATENT DOCUMENTS

| | | | |
|---|---|---|---|
| 7,406,030 B1* | 7/2008 | Rijsman | 370/216 |
| 7,508,772 B1* | 3/2009 | Ward et al. | 370/254 |
| 2003/0140167 A1* | 7/2003 | Harvey et al. | 709/238 |
| 2003/0231587 A1* | 12/2003 | Sankaran et al. | 370/230 |
| 2006/0171404 A1* | 8/2006 | Nalawade et al. | 370/401 |
| 2007/0162614 A1* | 7/2007 | Patel et al. | 709/239 |
| 2009/0164835 A1 | 6/2009 | Uttaro | |
| 2009/0296568 A1* | 12/2009 | Kitada | 370/221 |
| 2010/0220736 A1 | 9/2010 | Mohapatra et al. | |
| 2012/0213218 A1* | 8/2012 | Yilmaz et al. | 370/351 |

OTHER PUBLICATIONS

Uttaro et al. "BGP Persistence" draft-uttaro-idr-bgp-persistence-01, Network Working Group, Internet-Draft, Mar. 9, 2012, 24 pgs.
Extended European Search Report dated Oct. 28, 2013 in corresponding EP Application No. 13173726.4, 5 pgs.

(Continued)

*Primary Examiner* — Marcus R Smith
*Assistant Examiner* — Siren Wei
(74) *Attorney, Agent, or Firm* — Shumaker & Sieffert, P.A.

(57) ABSTRACT

In general, techniques are described for selectively invoking graceful restart procedures when a route reflector member of a redundant route cluster fails. In one example, a method is provided that includes determining, by a provider edge router that supports graceful restart procedures, that a first router forms a redundant group with at least a second router. The method also includes detecting a failure of the first router and determining that at least the second router in the redundant group is operating approximately while the first router is failed. The method further includes overriding graceful restart procedures with respect to the failed first router when at least the second router is operating. The method also includes forwarding one or more data packets according to route information provided via the second router.

19 Claims, 4 Drawing Sheets

(56) References Cited

OTHER PUBLICATIONS

Sangli et al. "Graceful Restart Mechanism for BGP" Network Working Group, Request for Comments: 4724, Jan. 2007, 14 pgs.

Patel et al. "Accelerated Routing Convergence for BGP Graceful Restart" Network Working Group, Internet Draft, IETF Trust, Jun. 29, 2011, 9 pgs.

Scudder et al. "Multisession BGP" Internet Engineering Task Force, Internet-Draft, IETF Trust, Mar. 28, 2011, 20 pgs.

Response filed Jun. 17, 2014 to the Extended European Search Report dated Oct. 28, 2013 in corresponding EP Application No. 13173726.4, 10 pgs.

* cited by examiner

SELECTIVE BGP GRACEFUL RESTART IN REDUNDANT ROUTER DEPLOYMENTS

TECHNICAL FIELD

The invention relates to computer networks and, more specifically, to techniques to reduce a recovery period in the event a network device incurs a failure.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device along a given route. Upon receiving an incoming packet, the router examines information within the packet to identify the destination for the packet. Based on the destination, the router forwards the packet in accordance with the forwarding information.

Some computer networks, such as the Internet, an administrative domain or network, often include many routers that exchange routing information according to a defined routing protocol. Examples of the defined routing protocol may include, among others, the Border Gateway Protocol (BGP), the Intermediate System to Intermediate System (IS-IS) Protocol, and the Open Shortest Path First (OSPF) Protocol. When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to inform that some routes are no longer available.

A computer network utilizing BGP directs data packets between network nodes based on addressing information with the data packets. A BGP network may include one or more routers, nodes, and end point devices (e.g., servers, printers, and computers). Some of the routers within the BGP network may be grouped together into redundant clusters. Each router within the BGP network typically forwards packets according to routes stored at the router and the destination address of the data packets.

In the event of a routing communication session failure from a failed router, i.e., the session faults or "goes down," a surviving router may select one or more alternative routes through the computer network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information may propagate outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity, increased packet loss, and latency.

As one technique for reducing the impact of failures, some routers support "graceful restart," which refers to the capability of preserving forwarding information while restarting a routing communication session with a peer router that may have failed. When establishing a routing communication session, a router that supports graceful restart may advertise the capability to the peer router and may specify a restart time. The restart time is the estimated time for the router to reestablish the routing communication session after failure of the previous session. Upon failure of the routing communication session, the surviving router preserves any forwarding information currently in its forwarding plane from a failed router based on the expectation that the failed router will shortly reestablish the routing communication session. In other words, the surviving router will maintain the failed router within a forwarding path of the surviving router for a "grace period" in the event of a failure of the routing communication session. During the grace period, the failed router preserves forwarding information in a state that existed prior to the failure and may relearn the network topology and recalculate its routing information and forwarding information. Consequently, the surviving router does not need to find alternative routes unless the failed router does not reestablish the routing communication session within the advertised restart time. Moreover, the surviving router does not propagate a change in the state of the failed router to the network during a graceful restart interval. As a result, the routing instability caused by routing flaps within the network may be reduced.

SUMMARY

In general, techniques are described for reducing the impact of a failure of a network device. For example, techniques are described for selectively invoking graceful restart in certain network environments where redundant routers may be deployed, such as a cluster of redundant route reflectors. As one example, routers within the network that support graceful restart may detect when a failed router is a route reflector in the redundant group and may, in response, invoke an override control mechanism to deactivate the normal graceful restart operation. That is, instead of executing a graceful restart operation as would typically be invoked, peer routers supporting graceful restart may immediately identify and failover to use of routes learned from an operational route reflector within the redundant group. In this case, the peer routers forward data packets according to routing information previously learned from the second route reflector in the redundant group according to a routing protocol, such as Border Gateway Protocol (BGP).

Techniques disclosed herein reduce or eliminate a window of vulnerability in the case in network deployments in which routers support graceful restart and two or more peer routers provide redundant routing functions within the network from a control plane point of view. Furthermore, techniques disclosed herein may reduce the amount of traffic lost during a failure of a network device. For example, techniques disclosed herein allow for forwarding data packets according to redundant routes stored in a peer router of a failed router during restart of the failed router. Moreover, the techniques allow for the redundant routes to be updated by an operational router within the cluster while the failed router recovers, thereby avoiding any black hole that may have otherwise resulted during a graceful restart period associated with the failed router. A black hole refers to a place in a network where incoming traffic is dropped or otherwise lost without informing the source that the data did not reach its destination.

In one example, a method is provided that includes determining, by a provider edge router that supports graceful restart procedures, that a first router forms a redundant group with at least a second router. The method further includes detecting, by the provider edge router, a failure of the first router, wherein the provider edge router is a peer of the first router and determining, by the provider edge router, that at least the second router in the redundant group is operating approximately while the first router is failed. The method further includes overriding, by the provider edge router, graceful restart procedures with respect to the failed first router when at least the second router is operating. The method also includes forwarding, by the provider edge router, one or more data packets according to route information provided via the second router.

In another example, a graceful restart enabled network device comprises at least one interface card. The graceful restart enabled network device also comprises a routing control unit having one or more processors that determines that a first router forms a redundant group with at least a second router, detects a failure of the first router, wherein the graceful restart enabled network device is a peer of the first router, determine that at least the second router in the redundant group is operating approximately while the first router is failed, and overrides graceful restart procedures with respect to the failed first router when at least the second router is operating. The graceful restart enabled network device further comprises a forwarding unit that forwards one or more data packets according to route information provided via the second router.

In yet another example, a tangible non-transitory computer-readable medium comprising instructions for causing a programmable processor to perform operations comprising determining, by a provider edge router that is graceful restart enabled, that a first router forms a redundant group with at least a second router. The instructions further include detecting, by the provider edge router, a failure of the first router, wherein the provider edge router is a peer of the first router and determining, by the provider edge router, that at least the second router in the redundant group is operating approximately while the first router is failed. The instructions also include overriding, by the provider edge router, graceful restart procedures with respect to the failed first router when at least the second router is operating. The instructions include flushing route information provided via the first router and forwarding, by the provider edge router, one or more data packets according to route information provided via the second router.

The details of one or more examples are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present invention. Like reference characters denote like elements throughout the figures and text.

DETAILED DESCRIPTION

Figure 1:
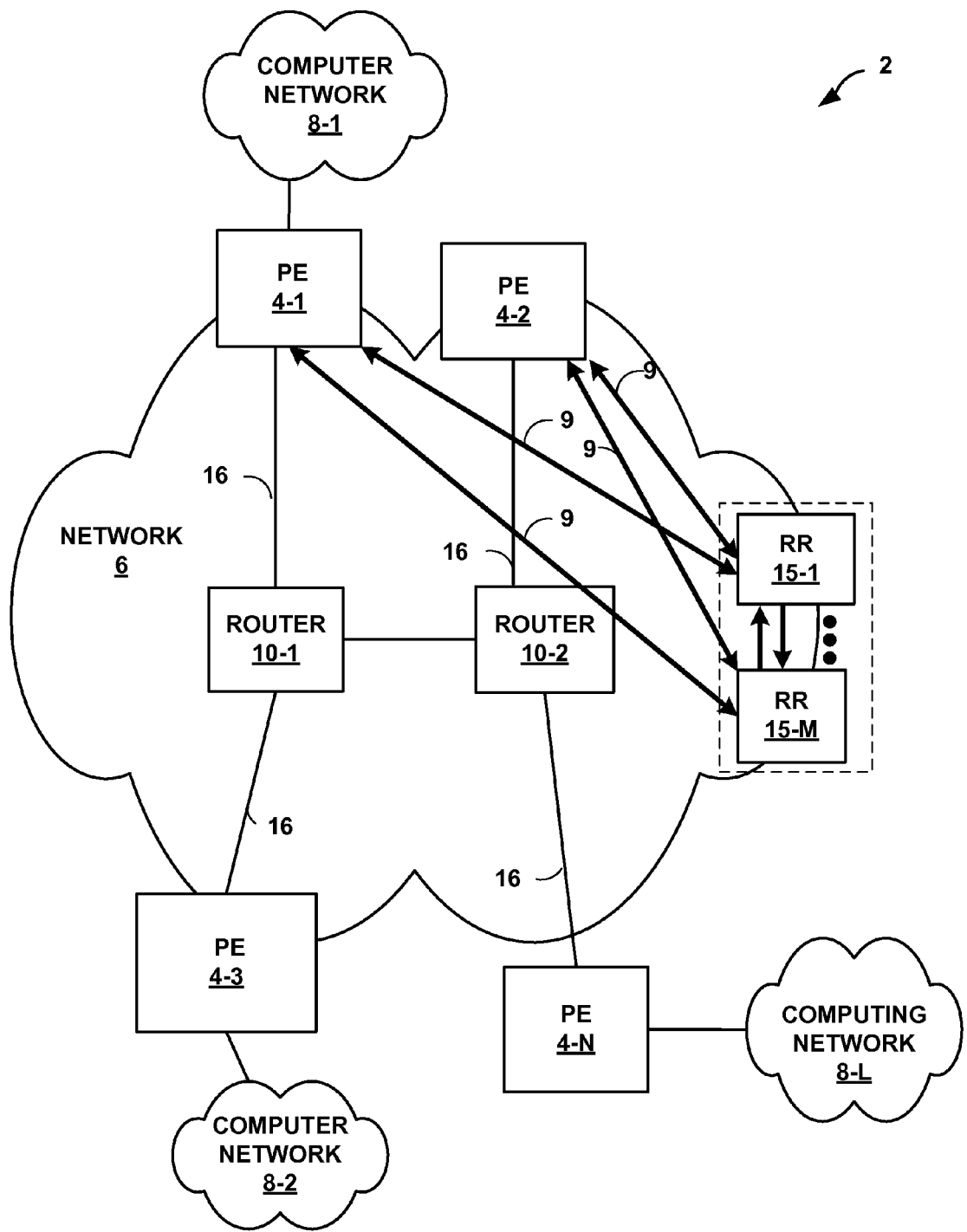
FIG. 1 is a block diagram illustrating an example computer network in which some network devices form a redundant route reflector cluster, in accordance with techniques described herein.

FIG. 1 is a block diagram illustrating an example communication network 2 in which some network devices selectively invoke graceful restart in accordance with the techniques described herein. In the example of FIG. 1, communication network 2 includes an intermediate network 6, such as a service provider network, that interconnects computer networks 8-1 through 8-L, collectively referred to as "computer networks 8." Designator L may be any number of computer networks 8 that communication network 2 supports. Computer networks 8 are communicatively connected to at least one provider edge router 4 of network 6. FIG. 1 is just one example of a communication network 2 and is not meant to be limiting.

In the example of FIG. 1, network 6 includes provider edge (PE) routers 4-1 through 4-N, collectively referred to as "provider edge routers 4." A provider edge router 4 may refer to any router coupled to a route cluster. That is, a provider edge router 4 may be any type of router that is a client router of a redundant route reflector cluster. Network 6 also includes core routers 10-1 and 10-2, collectively referred to as "routers 10." Each router 4 and 10 is connected to at least one other router 4 or 10 through one or more data links 16 through 16 (referred to collectively as "data links 16"). Provider edge router 4-1 which serves as an ingress point (and, in some cases, an egress point) between computing network 8-1 and network 6. Network 6 also comprises provider edge routers 4-2 through 4-N that function as ingress or egress points. For illustrative purposes only, FIG. 1 depicts network 6 as comprising four provider edge routers, PEs 4-1 through 4-N. In other examples, network 6 comprises other numbers of provider routers 4, including multiple ingress and egress routers.

In the example of FIG. 1, route reflectors 15-1 and 15-2, also referred to herein as "route reflectors 15," form a redundant route reflector cluster 14, in accordance with techniques described herein. In general, a route reflector is a specialized router that operates as a central point for advertising routes throughout a network. A route reflector, for example, maintains peering routing sessions 9 with other routers within the network and "reflects" any routes learned by one peering session to the other routers in the network. In this way, the routers need not maintain a full mesh of peering sessions but instead need only maintain a routing session 9 with the route reflector in order to learn routes throughout the network. In general, each of routers 4, 10 establish communication sessions 9, referred to herein as "peer routing sessions" or simply "routing sessions," with each route reflector 15-1, 15-2 to exchange routing information throughout network 6 according to a defined routing protocol, such as the Border Gateway Protocol (BGP). For ease of illustration, only peer routing sessions between PE routers 4-1, 4-2 and router reflectors 15-1, 15-2 are shown, although similar routing sessions exist between each of routers 4, 10 and each route reflector 15. Routers 4, 10 communicate with route reflectors 15 via the routing sessions 9 to incrementally update the routing information and, in turn, update their forwarding information in accordance with changes to a topology of the network indicated in the updated routing information. Although FIG. 1 is discussed in terms of BGP, the techniques apply to other types of routing protocols.

Route reflector cluster 14 includes peer routing components that form a redundant group with respect to a given set or subset of routing information. Within cluster 14, the routing information in route reflectors 15 may be approximately synchronized such that each route reflector 15 in cluster 14 has a copy of the same routing information. For example, route reflectors 15 have exactly the same routing information. In other examples, route reflectors 15 have mostly the same routing information, but at any given time the states of route reflectors 15 may be somewhat different. In some examples, each route reflectors 15-1 and 15-2 of cluster 14 may be separate devices that operate independently from each other. In other examples, route reflector router reflectors 15-1 and 15-2 may be multiple virtual devices of the same physical device. For purposes of illustration only, techniques will be discussed herein in terms of route reflector cluster 14 having the two peer routers, route reflectors 15-1 and 15-2. However, the techniques described may apply to route reflector clusters having three or more routers.

In the example of FIG. 1, one or more routers 4 and 10 support graceful restart, which allows for the forwarding of data packets to continue along known, stale routes while the routing session is restored. Graceful restart may reduce the impact of a failure of a routing communication session 9 that may be due to a failure of one or more network devices within a computer network. Graceful restart is an extension to the BGP routing protocol specified in "Graceful Restart Mechanism for BGP," RFC 4724, The IETF Trust (2007), the entire contents of which is incorporated herein by reference. During a failure or planned outage of a router using this extension, other "helper" routers may retain the failed router's routes, pending re-establishment of BGP routing sessions. The interval between failure and full recovery may be relatively long (e.g., several minutes). Changes in routing during this interval may not be reflected on helper routers, leading to periods of black holing or forwarding loops.

Techniques described herein may allow a graceful restart enabled router, such as router 4-2, to override graceful restart procedures when a route reflector 15 of cluster 14 fails and router 4-2 currently has an active BGP session with at least one route reflector of the cluster. If there is no route reflector in cluster 15 with the failed route reflector that has an active BGP session with router 4-2, then router 4-2 invokes conventional graceful restart procedures. That is, the techniques allow a router, such as router 4-2, to selectively invoke graceful restart in certain network environments where redundant routers may be deployed, such as a cluster of redundant route reflectors. As one example, routers 4, 10 within network 6 that support graceful restart may detect when a failed router 15 is a member of a redundant group and may, in response, invoke an override control mechanism to deactivate the normal graceful restart operation when there is another non-failed router in the redundant group. That is, instead of executing a graceful restart operation as would typically be invoked, peer routers 4, 10 supporting graceful restart may immediately identify and failover to use of routes learned from an operational route reflector 15 within the redundant group 14. In this case, the peer routers forward data packets according to routing information previously learned from the second route reflector in the redundant group according to a routing protocol, such as Border Gateway Protocol (BGP). For example, when route reflector 15-1 fails, PE 4-2 immediately switches to forwarding data packets using the redundant routing information already learned from of peer route reflector 15-2 even though both route reflector 15-1 and PE 4-2 support graceful restart. In other words, PE 4-2 does not allow route reflector 15-1 the normal "grace period" associated with graceful restart and instead immediately switches to using routes learned from a different route reflector in redundant cluster 14, i.e., route reflector 15-2 in this example. In this way, graceful restart may be overridden when only a subset of the route reflectors in cluster 14 fails, but may be used when all of the route reflectors have failed, i.e., all of route reflectors 15-1 and 15-2 in this example.

More specifically, in the example of FIG. 1, each router 4, 10 supports graceful restart. Each router 4, 10 and 15 may announce its ability to perform a graceful restart to a neighbor router. As used herein, graceful restart is a capability of preserving forwarding information while restarting a routing communication session. There is often a time interval during graceful restart when the routing communication session is down and the failed router has not yet come back up and synchronized with the other router in the cluster. During that interval, the communication session may have a frozen routing table with stale routes that were distributed before the router failed. When graceful restart is invoked, these stale routes are maintained within the routing tables of peer routers until the failed router has restarted and approximately resynchronized with the other routers. That is, the peer routers continue to forward packets using the stale routing information until the failed router recovers or the grace period expires.

However, this disclosure recognizes that environments having redundant route reflectors, such as the example of FIG. 1, may benefit if graceful restart can be selectively overridden under certain circumstances. For example, if data packets are forwarded according to the stale routes of a failed route reflector then an error may occur during the grace period when the routing tables of other route reflectors are updated. One potential error is that a forwarding loop may be established when data packets are forwarded according to the stale routes in a communication session with a networking cluster.

As such, in accordance with the techniques described herein, a graceful restart enabled router 4, 10 will not perform a graceful restart unless every route reflector 15 of cluster 14 also fails. For example, when a peer router 4, 10 detects a session failure with one of route reflectors 15, the peer router 4, 10 immediately switches to forwarding data packets in accordance with a copy of the routes as learned from a different one of route reflectors 15 that is still operational.

A given response to a failure in a route reflector cluster is based on a number of factors. These factors may include a position of the router in the topology of the network, especially whether the router is part of a cluster. Furthermore, another factor that may influence the response of a surviving router in whether graceful restart has been disabled for a failed router in a route cluster. Another factor that may influence the response of a surviving router includes which router and how many routers of the route cluster have failed. Several examples of these different factors will be described in detail below with respect to FIGS. 3A and 3B.

Techniques disclosed herein may reduce or eliminate the window of vulnerability in the case where communication network 2 includes two or more peer route reflectors 15-1 and 15-2 in a redundant cluster 14. Furthermore, techniques disclosed herein may reduce the amount of traffic lost during a failure of a network device in a cluster, such as route reflector 15-1 in cluster 14. Particularly, techniques disclosed herein allow for forwarding data packets according to redundant routes learned from in a peer route reflector 15-2 of a failed route reflector 15-1 during restart of failed route reflector 15-1. Moreover, such redundant routes may be immediately updated by the routing session with route reflector 15-2, thereby reducing any window in which a stale route from route reflector 15-2 would otherwise be used. In this manner, graceful restart may not be initiated unless all routers in a cluster are in a failed state at the same time. The approaches described herein maintain compatibility, including backwards compatibility, with BGP procedures.

Figure 2:
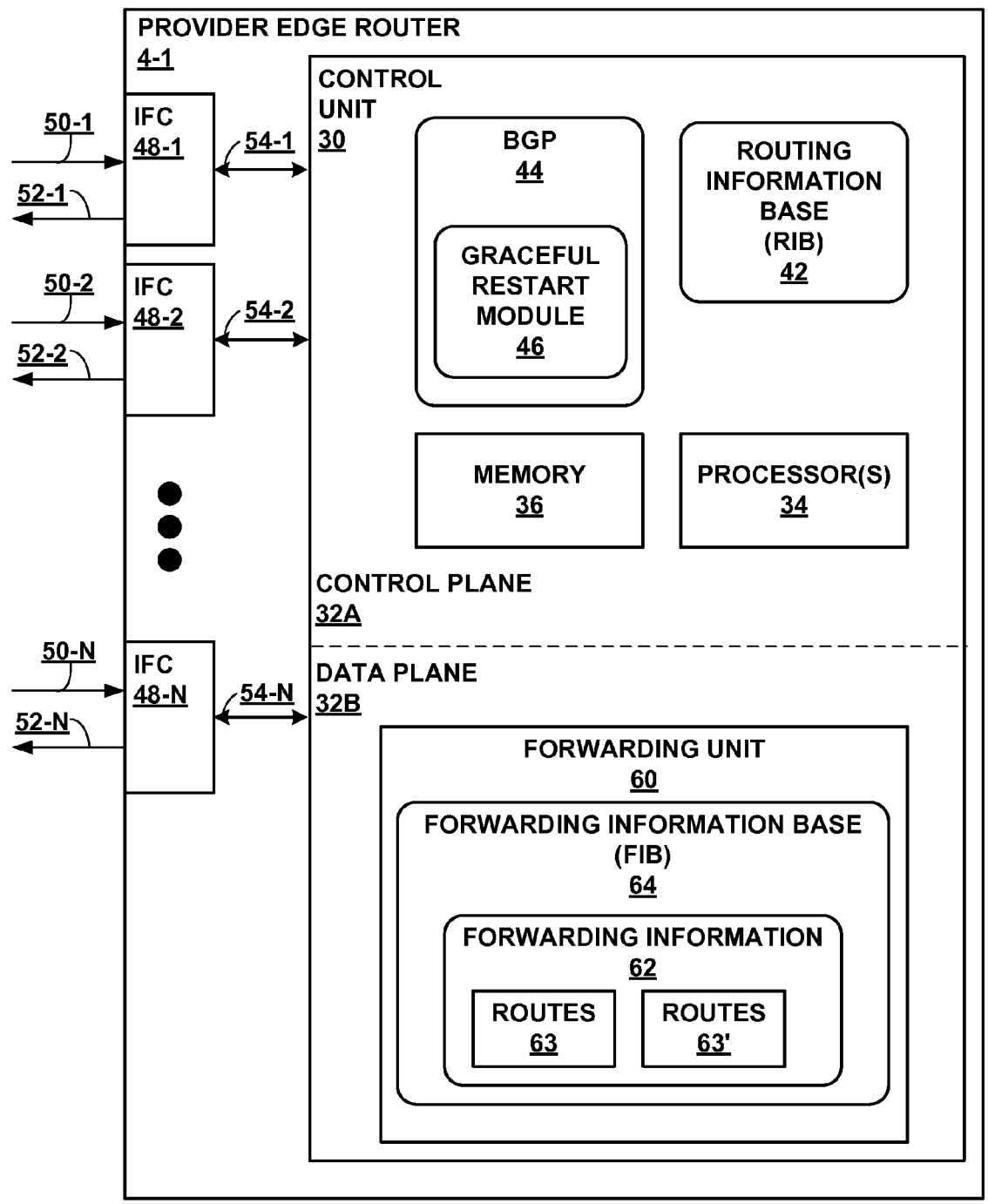
FIG. 2 is a block diagram illustrating one exemplary embodiment of a provider edge (PE) router that forwards data packets according to redundant routes in redundant route reflector cluster when a communication session with a router of the cluster is down, in accordance with techniques described herein.

FIG. 2 is a block diagram illustrating one exemplary embodiment of a provider edge (PE) router 4-1 that forwards data packets according to redundant routes in redundant route reflector cluster when a communication session with a router of the cluster is down, in accordance with techniques described herein. For purposes of illustration, FIG. 2 is discussed in terms of provider edge (PE) router 4-1 and communication network 2 of FIG. 1. For example, PE router 4-1 forwards data packets according to redundant routes in redundant route reflector cluster 14 when a BGP session with a route reflector 15-1 or 10-2 of cluster 14 is down. However, in other examples, PE router 4-1 may be any PE router 4 or other router. Moreover, while FIG. 2 is described with respect to a particular network device, e.g., a router, the techniques may be implemented by any network device that operates according to the Border Gateway Protocol. The techniques should therefore not be limited to the examples described in this disclosure.

PE 4-1 includes a control unit 30 and a forwarding unit 60. Control unit 30 and forwarding unit 60 receive and send information to a network, such as communications network 2 of FIG. 1, via communication links 16. PE 4-1 further includes interface cards 48-1 through 48-N (collectively referred to herein as "IFCs 48") coupled to control unit 30 via internal links 54-1 through 54-N. N, as used in FIG. 2, may be any positive integer. Communication links 50-1 through 50-N and 52-1 through 52-N are coupled to other routers. For example, communication links 50-1 and 52-1 connect PE 4-1 to route reflector 15-1. Similarly, communication links 50-2 and 52-2 connect PE 4-1 to route reflector 15-2. In other examples, communication links 50-1 through 50-N and 52-1 through 52-N connect PE 4-1 to other routers, and possible more or less routers than as shown in FIG. 1.

Control unit 30 comprises one or more processors 34 that execute software instructions, such as those used to define a software or computer program. The software instructions are stored in a computer-readable storage medium or memory 36. Examples of a non-transitory computer-readable medium include a storage device such as, a disk drive or an optical drive. Examples of such memory 36 include random access memory (RAM), read-only memory (ROM), non-volatile random access memory (NVRAM), electrically erasable programmable read-only memory (EEPROM), flash memory, and the like. In some examples, memory 36 stores instructions to cause the one or more processors 34 to perform the techniques described herein.

Moreover, the functions of control unit 30 are implemented by executing the instructions of the computer-readable medium with one or more processors, discrete hardware circuitry, firmware, software executing on a programmable processor, or a combination of any of the above. For example, control unit 30 comprises dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 is divided into two logical or physical "planes" to include a first control or routing plane 32A (referred to herein as "control plane 32A") and a second data or forwarding plane 32B (referred to herein as "data plane 32B"). That is, control unit 30 implements two separate functionalities, for example, the routing/control and forwarding/data functionalities, either logically or physically. The two separate functionalities may be implemented logically as separate software instances executing on the same set of hardware components. The two separate functionalities may be implemented physically as separate physical dedicated hardware components that either statically implement the functionality in hardware or dynamically execute software or a computer program to implement the functionality.

Control plane 32A of control unit 30 may execute the routing functionality of provider edge router 4-1. In this respect, control plane 32A may represent hardware or a combination of hardware and software of control unit 30 that may implement a routing protocol, such as broad gateway protocol (BGP) 44. BGP 44 establishes routing protocol sessions with peer routers for exchanging routing information stored in a routing information base "RIB" 42. RIB 42 includes information defining a topology of a network that provider edge router 4-1 is in, for example, network 6. For example, RIB 42 includes route information that identifies other routers in communications network 2 of FIG. 1. Control plane 32A resolves the topology defined by routing information in RIB 42 to select or determine one or more routes through communications network 2. Provider edge router 4-1 establishes BGP communication sessions for exchanging routing information that maps routers according to the network topology, e.g., network addresses defined within RIB 42.

Control plane 32A programmatically updates a forwarding information base (FIB) 64 within data plane 32B to store with forwarding information 62 in accordance with the topology of network 2 and label mapping information maintained within RIB 42. In some examples, data plane 32B is also referred to herein as a forwarding plane. Forwarding or data plane 32B may represent hardware or a combination of hardware and software of control unit 30 that forwards network traffic in accordance with forwarding information 70. FIB 64 is used in routing networks to store forwarding information

62. In contrast to RIB 42, FIB 64 is used for fast lookup of destination addresses. FIB 64 may, in some aspects, comprise one or more routing instances implemented by PE 4-1, with each instance including a separate routing table and other routing information. In such aspects, control plane 32A updates forwarding information 62 with forwarding information for each BGP session.

As shown in the example of FIG. 2, processor 34 executes any of a number of protocols for distributing data packets. For example, processor 34 executes Border Gateway Protocol (BGP) 44 to perform auto-discovery and signaling of mapping information.

Control unit 30 implements one or more routing protocols, such as BGP 44, to establish at least one communication session for BGP with neighboring routers or computing networks. For example, referring to FIG. 1, control unit 30 creates a BGP session between PE 4-1 and the first route reflector 15-1. Control unit 30 also creates a BGP session between PE 4-1 and the second route reflector 15-2. Control unit 30 may send capability information to peer routers via a BGP session that indicates PE 4-1 supports, for example, graceful restart, non-stop forwarding, and any other routing capabilities that PE 4-1 supports. Based on the learned routing information, control unit 30 maintains and updates routing information to describe a topology of communications network 2, and more particularly, routes through communications network 2. In some examples, the routing information is stored in FIB 64. Moreover, as shown in FIG. 2, BGP 44 updates RIB 2 and FIB 64 to maintain a first copy of routes 63 learned from route reflector 15-1 and a second copy of routes 63' learned from route reflector 15-2. Under normal operation, routes 63, 63' are identical.

Control unit 30 analyzes the stored routing information of RIB 42 and generates forwarding information 62 for forwarding unit 60. Forwarding information 60 associates, for example, network destinations with specific next hops. Forwarding unit 60 forwards network traffic via one or more of communication links 16 in accordance with forwarding information 62 generated by control unit 30. In some examples, forwarding information 62 is received by an IFC 48 from another router 10 connected to PE 4-1. In some examples, forwarding unit 60 comprises a forwarding engine that is responsible for the forwarding functionality of PE 4-1. Alternatively, forwarding unit 60 distributes the forwarding functionality within one or more interface cards (IFCs).

BGP 44 also includes a graceful restart module 46 that is executable by processor 34. Graceful restart module 46 can be used to disable graceful restart when a route reflector fails and at least one member of the redundant route reflector cluster maintains a BGP session. Graceful restart module 46 performs graceful restart only when every member of a redundant route reflector cluster has failed. For example, graceful restart module 46 invokes an override control mechanism to deactivate the normal graceful restart operation. Graceful restart module 46 determines when every router of a route reflector cluster, such as route reflectors 15-1 and 15-2 of cluster 14, has failed. Graceful restart module 46 initiates graceful restart for a router only when every router of the cluster is currently failed. In some examples, each router of a route reflector cluster comprises a graceful restart module that performs some or all of the functions described herein.

For illustrative purposes, consider an example with a route reflector cluster having three member route reflectors and a graceful restart enabled provider edge router communicatively coupled to each of the route reflectors in a cluster. At a first time, all three route reflector members of the cluster have a working BGP session with the graceful restart enabled provider edge router. At a second time, a first route reflector fails and the BGP session between it and the PE router is lost. The PE router overrides graceful restart because it still maintains BGP sessions with a second and third route reflector of the cluster. At a third time, before a BGP session with the first route reflector is re-established, the second route reflector fails. The PE router overrides graceful restart because it still maintains the BGP session with the third route reflector of the cluster. At a fourth time, before the BGP sessions with either the first or second route reflectors are re-established, the third route reflector fails. Because the PE router does not have a working BGP session with any route reflector having the redundant routing information, the PE router invokes graceful restart at that time.

If a BGP session fails for each and every router in a cluster, a provider edge router performs a graceful restart to continue to forward data packets while the BGP sessions are reestablished. A BGP session may fail for a number of reasons, including, among other scenarios, a failure of control unit 30 or of a control unit of another router, such as route reflector 15-1. When a control unit of a router fails, the router is no longer able to connect to the BGP session. However, in some situations, a forwarding unit of the router is still available. For example, if a router 10-1 has an error or otherwise fails, the BGP session will be lost or "goes down" but its forwarding unit may be capable of forwarding data packets. In this situation, graceful restart module 46 of a peer router, such as PE 4-1, may invoke graceful restart capabilities without initiating a routing change within data plane 32. However, when graceful restart module 46 detects that the BGP session with a route reflector cluster is down, the module may override the normal grace period and graceful restart capability supported by the routers and instead immediately reprogram FIB 64 to use the second copy of routes learned from a peer route reflector, such as route reflector 15-2 in this example. However, in most scenarios, the information in FIB 64 is not reprogrammed.

Figure 3A:
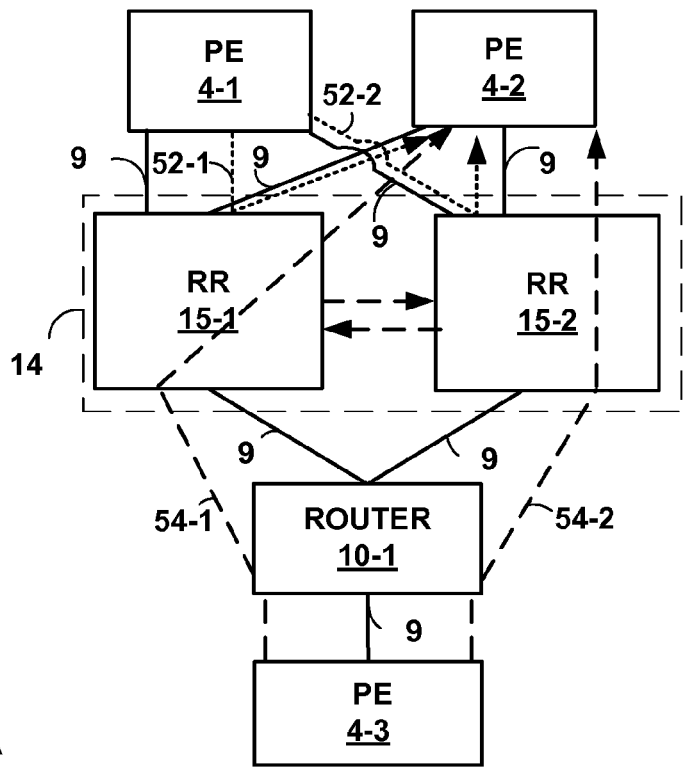
FIGS. 3A and 3B are block diagrams illustrating example forwarding procedures based on a position of a failed router in the network topology, in accordance with techniques described herein.
Figure 3B:
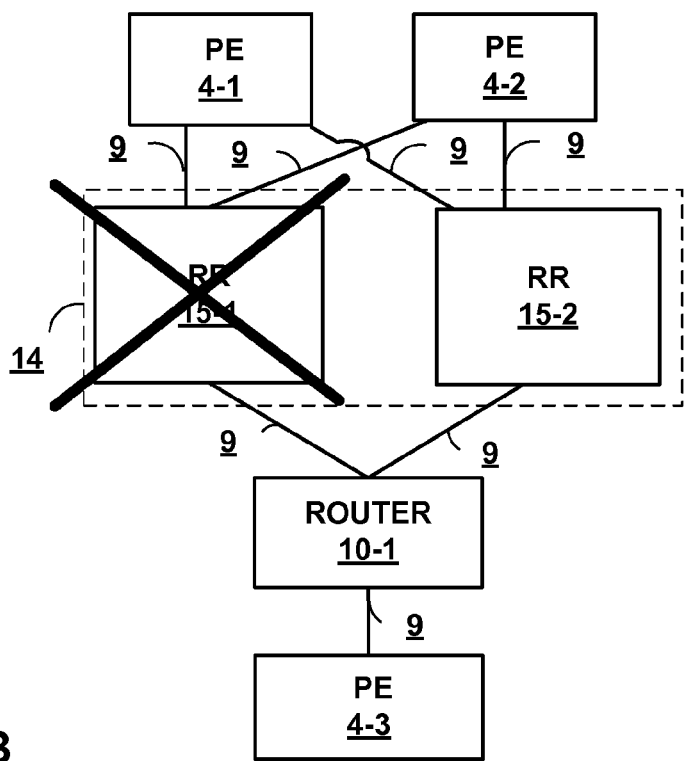

FIGS. 3A and 3B are block diagrams illustrating example forwarding procedures in accordance with techniques described herein. The examples in FIGS. 3A and 3B correspond with the network topology of communications network 2 of FIG. 1. Thus, for purposes of these examples, the routers shown in FIGS. 3A and 3B are routers of FIG. 1 and are discussed from the perspective of PE 4-2. However, in other examples, techniques described herein may apply to other routers joined with different network topology. FIGS. 3A and 3B are simplified versions of FIG. 1. The techniques discussed herein are extendable to more complicated networks.

The techniques for leveraging redundant routes during a failure of a router in a route reflector cluster and of disabling graceful restart procedures in specific situations may vary based on network topology and how many routers in a cluster fail. FIGS. 3A and 3B illustrate some example scenarios but are not intended to cover every possible situation. For purposes of these examples, each router has a BGP session established between itself and a neighboring router. One of the BGP sessions goes down due to a failure of one of the routers. The network may disable graceful restart and continue to forward network traffic with a peer router in a cluster of the failed router while the BGP session that went down is reestablished.

FIG. 3A illustrates an example where routes are advertised in a network including a route reflector cluster 14 and no routers have failed. FIG. 3A is an illustration of the network at a first time, t1. PE 4-1 and PE 4-2 are both communicating with each route reflector RR 15-1 and RR 15-2 of redundant route reflector cluster 14 via routing protocol sessions 9. PE 4-1 advertises to both route reflectors RR 15-1 and RR 15-2 a route to network destination prefix 10.1/16. That is, PE 4-1 announces that network destination prefix 10.1/16 is reachable through PE 4-1. These routes propagate through the route reflector topology and are learned by PE 4-2. Short dashed line 52-1 indicates how the route is propagated to PE 4-2 through RR 15-1. Short dashed line 52-2 indicates how the route is propagated to PE 4-2 through RR 15-2. In some examples, PE 4-1 learned the route 10.1/16 from an external peer.

In this example, PE 4-3 advertises a route to network prefix 10/8. These routes propagate through the route reflector topology and are learned by PE 4-2. Long dashed line 54-1 indicates how the route is propagated to PE 4-2 through RR 15-1. Long dashed line 54-2 indicates how the route is propagated to PE 4-2 through RR 15-2.

Route reflectors 15-1 and 15-2 maintain the similar routing data within cluster 14, and PE 4-2 maintains copies of routes learned from each route reflector. At this point, PE 4-2 has two options from which to choose when forwarding routes to a destination 10.1.1.1/32 as the network destination is reachable through both PE 4-1 and PE 4-3. In this example, PE 4-2 chooses to send that traffic via PE 4-1, since 10.1/16 is a more specific match for destination address 10.1.1.1 than 10/8 is. At this point, a routing process (e.g., BGP 44) selects the route through PE 4-1 and programs FIB 64 of data plane 32B to use the selected route learned from route reflector 15-1 (e.g., routes 63).

FIG. 3B illustrates the example of FIG. 3A when route reflector 15-1 of route reflector cluster 14 has failed. In this example, FIG. 3B comes at a time later than FIG. 3A, t2. BGP process 44 of PE 4-2 has determined that RR 15-1 and RR 15-2 form redundant route cluster 14. As such, when RR 15-1 fails, graceful restart module 64 overrides the graceful restart capabilities of PE 4-2 and instead flushes any routes learned from RR 15-1. In another example, routes may become inactive instead of flushed. For example, at t2, PE 4-2 flushes routes 63 learned from RR 15-1 and immediately starts using routes 63'. As such, data plane 32B of PE 4-2 proceeds to forward traffic only on current routing information learned via RR 15-2. Since routers 63 and 63' are identical, PE 4-2 may still elect to route traffic to destination 10.1.1.1/32 through PE 4-1. However, traffic to 10.1.1.1 approximately immediately switches to follow the backup path via PE 4-3. Further, in the event that PE 4-3 withdraws the route to network prefix 10.1/16, even before RR 15-1 has recovered, PE 4-3 learns of the withdrawal by way of RR 15-2 and, because PE 4-3 has elected to use routes 63', immediately removes the route and proceeds to uses 10/8 route through PE 4-3 for reaching destination address 10.1.1.1. Thus, there is no interval of misrouting as there is with conventional Graceful Restart where PE 4-3 would have otherwise ignored the withdrawn route during the "grace period" while it continued to forward using stale routes 63 associated with RR 15-1.

In another example, upon detecting that both RR 15-1 and RR 15-2 were in a failed state at the same time, graceful restart module 46 commences graceful restart procedures.

An advantage of disabling Graceful Restart when a failed router is part of a redundant cluster is that instead of just reducing the interval of vulnerability, it eliminates it in the single-fault case. Techniques described herein are interoperable with existing deployments of BGP Graceful Restart. In some examples, an extension to BGP to perform techniques described herein does not need to be standardized.

Figure 4:
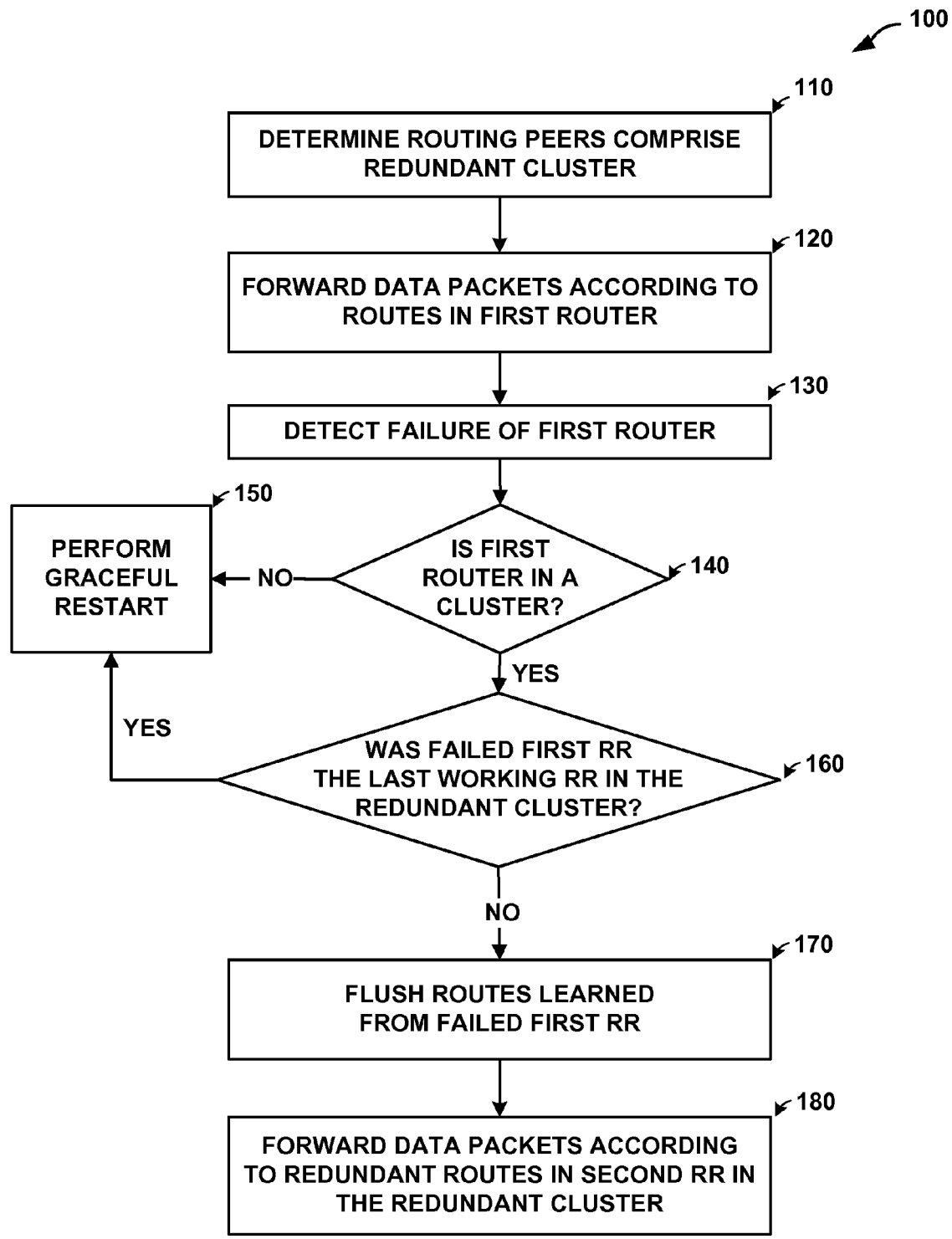
FIG. 4 is a flow diagram illustrating an example operation of a network forwarding data packets while a communication session of at least one member of a redundant route reflector cluster is down, in accordance with techniques described herein.

FIG. 4 is a flow diagram illustrating an example method 100 of a network forwarding data packets while a communication session of at least one member of a redundant route reflector cluster is down, in accordance with techniques described herein. The example method 100 of FIG. 4 corresponds with the network topology of communications network 2 and of the routers 4 and 10 of FIG. 1. Thus, for purpose of this example, method 100 is discussed from the perspective of PE 4-2 of FIGS. 1, 3A, and 3B. However, in other examples, techniques described herein may apply to other routers joined with different network topology. The techniques discussed herein are extendable to other topologies, including more complicated networks.

Method 100 includes a router, such as PE 4-2, determining that routing peers comprise a redundant cluster (110). For example, PE 4-2 may determine that route reflectors 15-1 and 15-2 comprise cluster 14. In some examples, PE 4-2 determines that RRs 15-1 and 15-2 form cluster 14 through receiving information about the topology of communication network 2. In other examples, PE 4-2 receives information from an external source identifying RRs 15-1 and 15-2 as redundant peers of cluster 14. In other examples, PE 4-2 detects potential cluster identifications ("IDs") that may be carried along with each route that RR 15-1 and RR 15-2 sends. In yet another example, routes that are being installed in an RIB of PE 4-2 that have been learned by BGP peering sessions can be used to detect whether the routes are coming from the same cluster ID. If so, those routers may be identified as forming a redundant route cluster. In a further example, an extension is added to BGP wherein routers announce whether they from a redundant route cluster.

A BGP session may be established between PE 4-2 and each of RRs 15-1 and 15-2. Method 100 further includes forwarding data packets according to routes in a first router (120). The first router may be any router in the network, such as RR 15-1 or router 10-3. PE 4-2 may forward traffic according to routes received via RR 15-1 and RR 15-2.

At some point, one of the route reflectors fails, and a BGP session between PE 4-2 and the failed router is ended. Once a failure has occurred, PE 4-2 detects failure of the first router (130). Once the first router has failed, method 100 determines whether the first router is in a redundant route reflector cluster (140). For example, PE 4-2 may identify which router has failed. Based on which router failed, PE 4-2 compares the identity of the first router with routers known to be in a redundant cluster. If the first router is identified as member of a redundant cluster, then PE 4-2 determines the first router is part of a cluster and has at least one redundant peer router.

If the first router is not in a redundant cluster, PE 4-2 invokes graceful restart for the first router (150). If the first router is a member of a redundant cluster, method 100 determines whether the failed first router was the last working route reflector in the redundant cluster (160). If the failed first router was the last working route reflector in the cluster, then every route reflector in the cluster is failed. Thus, there are no current redundant routes to continue forwarding data packets. Therefore, normal graceful restart operations are invoked (150). For example, PE 4-2, a peer of first route reflector 15-1, invokes normal graceful restart operations when second route reflector 15-2 is also failed when first route reflector 15-1 fails. This way, PE 4-2 retains stale routes from the redundant route cluster. In this case, the network can take advantage of the Graceful Restart mechanism. In sum, if all routers in a cluster fail, the final set of routes is maintained with the assumption that they would still be operating and forwarding traffic.

If the failed first router is not the last working route reflector in the cluster, then there is at least one operating redundant route reflector in the cluster that can be used to supply up-to-date routing information. When there is at least one operating redundant route reflector in the cluster, the peer router flushes routes learned from the failed first route reflector (170). For example, when RR 15-1 fails and RR 15-2 is still operational, PE 4-2 flushes or labels inactive the routes it learned from failed RR 15-1. In some examples, PE 4-2 reprograms the data plane to use copies of routes learned from a redundant RR in the cluster.

Once the routes have been flushed, the peer router continues to forward data packets according to the redundant routes of the second, operating route reflector in the redundant cluster (180). In this way, the peer router may invoke an override control mechanism to deactivate the normal graceful restart operation when another route reflector of the cluster is operating. For example, PE 4-2 overrides graceful restart operations in light of the failure of RR 15-1 and approximately immediately begins to forward data packets according to the routes PE 4-2 learned via RR 15-2. That is, knowing that RR 15-1 has failed and that RR 15-1 and RR 15-2 form cluster 14, PE 4-2 flushes the routes learned from the failed first route reflector, RR 15-1. These routes are flushed instead of being marked as stale and used, as in conventional Graceful Restart procedures, because a copy of the routes is available from a non-failed member of the cluster. PE 4-2 continues to forward data packets according to the redundant routes in the second route reflector, namely those in RR 15-2. In another example, during the recovery phase of a graceful restart, as soon as the end-of-RIB marker is received from any route reflector of the redundant group, any stale routes for that redundant group may be flushed.

In some examples, an administrator of communication network 2 may be able to define a redundant route cluster. For example, a user interface may be provided to enable an administrator to define redundant route clusters in a network. Redundant route clusters may also be defined, by an administrator or otherwise, for subsets of routing information.

In other examples, RR 15-1 and RR 15-2 provide the same routing table to PE 4-2. This may also be done for the entire set of routes or for subsets of routes. In some examples, any information that can distinguish a route can determine a subset of routes. For example, PE 4-2 can be configured to say that even numbered routes are considered redundant, but that odd numbered routes are not redundant.

In general, techniques have been described for reducing the impact of failure of a router that forms a redundant route cluster with at least one other router. In particular, techniques are described for not performing a graceful restart for a graceful restart enabled router when a failed peer router is part of a redundant route cluster. Techniques disclosed herein reduce or eliminate the temporal window of vulnerability in the case where a communication network includes a redundant route cluster. Furthermore, techniques disclosed herein may reduce the amount of traffic lost during a failure of a network device in a cluster. Particularly, techniques disclosed herein allow for forwarding data packets according to redundant routes stored in a peer router of a failed router during restart of the failed router. In this manner, graceful restart may not be initiated unless all routers in a cluster are failed at the same time. The approaches described herein maintain compatibility, including backwards compatibility, with BGP procedures.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (for example, in RAM or cache).

Various aspects of the disclosure have been described. Aspects or features of examples described herein may be combined with any other aspect or feature described in another example. These and other embodiments are within the scope of the following claims.

The invention claimed is:

1. A method, comprising:
   determining, by a provider edge router that supports graceful restart procedures, that a first route reflector that advertises a set of routes forms a redundant group with at least a second route reflector that advertises the set of routes;
   receiving, by the provider edge router from the first route reflector, a first copy of the set of routes and forwarding data packets according to the first copy of the set of routes;
   receiving, by the provider edge router from the second route reflector, a second copy of the set of routes;
   detecting, by the provider edge router after receiving the first copy of the set of routes and the second copy of the set of routes, a failure of the first route reflector, wherein the provider edge router is a peer of the first route reflector;

overriding, by the provider edge router in response to determining the second route reflector in the redundant group is operating while the first route reflector is failed, graceful restart procedures with respect to the failed first route reflector and forwarding data packets according to the second copy of the set of routes from the second route reflector; and performing, by the provider edge router in response to determining the second route reflector and the first route reflector are concurrently failed, a graceful restart procedure with respect to the failed first route reflector and continuing to forward data packets according to the first copy of the set of routes from the first route reflector.

2. The method of claim 1,
wherein overriding graceful restart procedures comprises flushing the first copy of the set of routes from the first route reflector.

3. The method of claim 1, wherein determining that the first route reflector forms the redundant group with at least the second route reflector further comprises:
determining that the first route reflector forms the redundant group with at least the second route reflector with respect to the set of routes.

4. The method of claim 1, further comprising:
establishing a first Border Gateway Protocol (BGP) communication session between the provider edge router and the first route reflector; and
establishing a second Border Gateway Protocol (BGP) communication session between the provider edge router and the second route reflector.

5. The method of claim 1, wherein determining that the first route reflector forms the redundant group with at least the second route reflector further comprises:
receiving, by the provider edge router, configuration information identifying that the first route reflector and the second route reflector form a redundant group.

6. The method of claim 1, wherein determining that the first route reflector forms the redundant group with at least the second route reflector further comprises:
receiving, by the provider edge router, a first identification marker in a first signal from the first route reflector;
receiving, by the provider edge router, a second identification marker in a second signal from the second route reflector;
determining, by the provider edge router based on the first identification marker and the second identification marker, that the first route reflector and the second route reflector form the redundant group.

7. The method of claim 1, wherein determining that the first route reflector forms the redundant group with at least the second route reflector further comprises:
receiving, by the provider edge router, at least one signal identifying which routers form a redundant group with respect to the set of routes.

8. The method of claim 1, further comprising:
receiving, by the provider edge router, an end-of-RIB marker from a route reflector in the redundant group during a recovery phase of the graceful restart procedure; and
responsive to receiving the end-of-RIB marker, flushing, by the provider edge router, any stale route information from the first route reflector.

9. A graceful restart enabled network device, comprising:
a forwarding unit having at least one interface card;
a routing control unit having one or more processors that:
determines that a first route reflector peered with the network device to advertise a set of routes forms a redundant group with at least a second route reflector peered with the network device to advertise the set of routes;
receives, from the first route reflector, a first copy of the set of routes and causes the forwarding unit to forward data packets according to the first copy of the set of routes;
receives, from the second route reflector, a second copy of the set of routes;
detects, after receiving the first copy of the set of routes and the second copy of the set of routes, a failure of the first route reflector;
overrides, in response to determining the second route reflector in the redundant group is operating while the first route reflector is failed, graceful restart procedures with respect to the failed first route reflector and causes the forwarding unit to forward data packets according to the second copy of the set of routes from the second route reflector;
performs, in response to determining the second route reflector and the first route reflector are concurrently failed, a graceful restart procedure with respect to the failed first route reflector and continues to forward data packets according to the first copy of the set of routes from the first route reflector.

10. The graceful restart enabled network device of claim 9, wherein the routing control unit overrides graceful restart procedures by flushing the first copy of the set of routes from the first route reflector.

11. The graceful restart enabled network device of claim 9, wherein to determine that the first route reflector forms the redundant group with at least the second route reflector, the routing control unit determines that the first route reflector forms the redundant group with at least the second route reflector with respect to the set of routes.

12. The graceful restart enabled network device of claim 9, wherein the routing control unit establishes Border Gateway Protocol (BGP) communication sessions between the graceful restart enabled network device and each of the first route reflector and the second route reflector.

13. The graceful restart enabled network device of claim 9, wherein to determine that the first route reflector forms the redundant group with at least the second route reflector, the routing control unit receives configuration information identifying that the first route reflector and the second route reflector form a redundant group.

14. The graceful restart enabled network device of claim 9, wherein to determine that the first route reflector forms the redundant group with at least the second route reflector, the routing control unit
receives a first identification marker in a first signal from the first route reflector;
receives a second identification marker in a second signal from the second route reflector determines, based on the first identification marker and the second identification marker, that the first route reflector and the second route reflector form the redundant group.

15. The graceful restart enabled network device of claim 9, wherein to determine that the first route reflector forms the redundant group with at least the second route reflector, the routing control unit receives at least one signal identifying which routers form a redundant group with respect to the set of routes.

16. The graceful restart enabled network device of claim 9, wherein the one or more processors are further configured to receive by the provider edge router, an end-of-RIB marker from a route reflector in the redundant group during a recovery phase of the graceful restart procedure, and responsive to receiving the end-of-RIB marker, flush any stale route information from the first route reflector.

17. A tangible non-transitory computer-readable medium comprising instructions for causing a programmable processor to perform operations comprising:
  determining, by a provider edge router that is graceful restart enabled, that a first route reflector that advertises a set of routes forms a redundant group with at least a second route reflector that advertises the set of routes;
  receive, by the provider edge router from the first route reflector, a first copy of the set of routes and forwarding data packets according to the first copy of the set of routes;
  receive, by the provider edge router from the second route reflector, a second copy of the set of routes;
  detecting, by the provider edge router after receiving the first copy of the set of routes and the second copy of the set of routes, a failure of the first route reflector, wherein the provider edge router is a peer of the first route reflector;
  overriding, by the provider edge router in response to determining the second route reflector in the redundant group is operating while the first route reflector is failed, graceful restart procedures with respect to the failed first route reflector and forwarding data packets according to the second copy of the set of routes from the second route reflector and flushing the first copy of the set of routes from the first route reflector; and
  performing, by the provider edge router in response to determining the second route reflector and the first route reflector are concurrently failed, a graceful restart procedure with respect to the failed first route reflector and continuing to forward data packets according to the first copy of the set of routes from the first route reflector.

18. The tangible non-transitory computer-readable medium of claim 17, wherein determining that the first route reflector forms the redundant group with at least the second route reflector further comprises:
  determining that the first route reflector forms the redundant group with at least the second route reflector with respect to the set of routes.

19. A method comprising:
  receiving, by a provider edge router, a first copy of a set of routes from a first route reflector that advertises the set of routes via a first peering session and a second copy of the set of routes from a second route reflector that advertises the set of routes via a second peering session, wherein the first route reflector and at least the second route reflector form a redundant group and respectively support a graceful restart procedure with respect to the first peering session and the second peering session with the provider edge router;
  forwarding, by the forwarding plane of the provider edge router, data packets according to the first copy of the set of routes;
  by the provider edge router in response to determining the first peering session is failed while the second peering session is operational, overriding the graceful restart procedure with respect to the first peering session and instead configuring the forwarding plane of the provider edge router to forward data packets according to the second copy of the set of routes; and
  by the provider edge router in response to determining every peering session of the provider edge router with route reflectors in the redundant group is failed, performing the graceful restart procedure with respect to the first peering session and continuing to forward packets according to the first copy of the set of routes.

* * * * *